(12) United States Patent
Pelka

(10) Patent No.: US 10,702,069 B2
(45) Date of Patent: Jul. 7, 2020

(54) VEHICLE SEAT COMPRISING AN ADJUSTMENT DEVICE

(71) Applicant: GRAMMER AG, Amberg (DE)

(72) Inventor: Joachim Pelka, Amberg (DE)

(73) Assignee: GRAMMER AG, Amberg (DE)

( * ) Notice: Subject to any disclaimer, the term of this patent is extended or adjusted under 35 U.S.C. 154(b) by 0 days.

(21) Appl. No.: 16/185,415

(22) Filed: Nov. 9, 2018

(65) Prior Publication Data

US 2019/0142169 A1 May 16, 2019

(30) Foreign Application Priority Data

Nov. 10, 2017 (DE) .................. 10 2017 126 429

(51) Int. Cl.
| | |
|---|---|
| *A47C 7/60* | (2006.01) |
| *B60N 2/75* | (2018.01) |
| *B60N 2/10* | (2006.01) |
| *B60N 2/16* | (2006.01) |
| *B60N 2/24* | (2006.01) |

(52) U.S. Cl.
CPC .................. *A47C 7/60* (2013.01); *B60N 2/10* (2013.01); *B60N 2/1615* (2013.01); *B60N 2/24* (2013.01); *B60N 2/767* (2018.02); *B60N 2/77* (2018.02); *B60N 2/797* (2018.02)

(58) Field of Classification Search
CPC .......... A47C 7/60; B60N 2/797; B60N 2/767; B60N 2/77; B60N 2/10; B60N 2/1615; B60N 2/24
See application file for complete search history.

(56) References Cited

U.S. PATENT DOCUMENTS

| 4,478,308 | A | * | 10/1984 | Klaassen | ................ | B60K 26/00 |
| | | | | | | 180/326 |
| 4,702,520 | A | * | 10/1987 | Whisler | ................ | B60N 2/767 |
| | | | | | | 297/411.36 |
| 4,953,259 | A | | 9/1990 | Frye et al. | | |
| 6,341,821 | B1 | | 1/2002 | Rousseau | | |
| 7,014,255 | B2 | * | 3/2006 | Amamiya | ............. | B60N 2/143 |
| | | | | | | 296/190.08 |

(Continued)

FOREIGN PATENT DOCUMENTS

| DE | 102014209462 | 11/2015 |
| EP | 2832583 | 11/2016 |

(Continued)

OTHER PUBLICATIONS

Official Action for German Patent Application No. 102017126429.9, dated Jul. 9, 2018, 3 pages.

(Continued)

*Primary Examiner* — Philip F Gabler
(74) *Attorney, Agent, or Firm* — Sheridan Ross P.C.

(57) ABSTRACT

The invention relates to a vehicle seat comprising an operator device arranged at the side for operating vehicle seat and/or vehicle functions, and an adjustment device for adjusting a vertical position and/or a tilt level of the operator device with respect to the rest of the vehicle seat, wherein the adjustment device comprises an axis of rotation extending in the seat width direction, and a shaft which is connected to the operator device, is spaced apart from the axis of rotation and arranged so as to be pivotable about said axis together with the operator device.

14 Claims, 13 Drawing Sheets

(56) References Cited

U.S. PATENT DOCUMENTS

| | | | | |
|---|---|---|---|---|
| 7,438,318 B2* | 10/2008 | Sano | ................... | B66F 9/07545 |
| | | | | 280/756 |
| 7,600,819 B2* | 10/2009 | Armo | ..................... | B60N 2/767 |
| | | | | 297/411.35 |
| 8,079,438 B2* | 12/2011 | Kim | ........................ | B60N 2/06 |
| | | | | 180/326 |
| 8,388,262 B2* | 3/2013 | Klein | ................... | E02F 9/2004 |
| | | | | 404/83 |
| 8,483,914 B2* | 7/2013 | Copeland | ............ | B60N 2/0232 |
| | | | | 701/50 |
| 9,352,673 B2* | 5/2016 | Yasunobe | .............. | B60N 2/753 |
| 9,592,758 B2* | 3/2017 | Mahler | ................... | B60N 2/24 |
| 2007/0144133 A1 | 6/2007 | Drake et al. | | |
| 2018/0304789 A1* | 10/2018 | Robert | .................. | B60N 2/797 |
| 2019/0142169 A1* | 5/2019 | Pelka | ....................... | A47C 7/60 |
| 2019/0178355 A1* | 6/2019 | Pelka | .................. | B60N 2/1842 |

FOREIGN PATENT DOCUMENTS

| | | |
|---|---|---|
| JP | H06-1872 | 1/1994 |
| JP | 4286183 | 6/2009 |

OTHER PUBLICATIONS

Extended Search Report for European Patent Application No. 18201428.2, dated Apr. 26, 2019, 3 pages.

* cited by examiner

VEHICLE SEAT COMPRISING AN ADJUSTMENT DEVICE

CROSS-REFERENCE TO RELATED APPLICATION

This application claims the benefit of German Patent Application No. DE 10 2017 126 429.9 filed Nov. 10, 2017, the entire contents of which are incorporated herein by reference.

FIELD

The invention relates to a vehicle seat comprising an operator device arranged to the side for operating vehicle seat and/or vehicle functions, and an adjustment device for adjusting a vertical position and/or a tilt level of the operator device with respect to the rest of the vehicle seat.

BACKGROUND

Generic vehicle seats comprising such operator devices are already well known from the prior art. For example, these operator devices comprise a type of joystick and other controls such as buttons or switches and thus, for example, allow the driver or user to adjust, move and/or activate elements such as the vehicle seat and/or elements arranged on a vehicle with which the vehicle seat is associated, such as an excavator bucket.

Often, these operator devices are at least partly separated mechanically from seat adjustment devices for adjusting the vertical and/or longitudinal position of the seat, and are arranged on the side of the seat, for example. If an operator sits on the seat and has to adjust the seat height, the operator devices may, in some circumstances, be not so easy to access any longer.

SUMMARY

Against this background, the object of the present invention is, for a generic vehicle seat, to develop an adjustment device that allows the vertical position and/or tilt level of the operator device to be adjusted in a simple and cost-effective manner.

The object of the invention is achieved by a vehicle seat comprising an operator device arranged to the side for operating vehicle seat and/or vehicle functions, and an adjustment device for adjusting a vertical position and/or a tilt level of the operator device with respect to the rest of the vehicle seat, wherein the adjustment device comprises an axis of rotation extending in the seat width direction, and a shaft which is connected to the operator device, is spaced apart from the axis of rotation and arranged so as to be pivotable about said axis together with the operator device.

The arrangement of the axis of rotation and the shaft ensures that the shaft is arranged such that it can be manually or automatically pivoted about the axis of rotation in a simple manner. Since the shaft is connected to the operator device, the operator device can simply be pivoted therewith. As a result of the pivoting, preferably both the vertical position and the tilt level of the operator device can be altered with respect to the rest of the vehicle seat. The rest of the vehicle seat should be understood to mean, for example, everything that is not pivoted or e.g. the seat substructure.

According to a preferred embodiment, the vehicle seat is provided with one operator device and one adjustment device on both sides, i.e. on both the left-hand and right-hand side of the user. It is also advantageous if the shaft is pivotable about the axis of rotation by an angle from a range of +/−2° to +/−10°, preferably by +/−4°, starting from a center position.

Advantageously, a distance between the axis of rotation and the shaft can be permanently fixed and the axis of rotation is arranged behind the shaft in the seat longitudinal direction. Advantageously, the axis of rotation is arranged above the shaft in the seat vertical direction. Advantageously, both arrangements are valid regardless of the position of the shaft within its adjustment options, which are defined, for example, on the basis of the guide links described in more detail below.

To ensure that the shaft is guided, it is also preferable for a guide element, arranged in the direction of a central axis of the shaft and fixedly connected to the shaft, to be moved within a guide link of a link element with respect to the shaft pivoting about the axis of rotation, the guide link having at least one first part shaped so as to extend along a portion of an arc, the arc preferably being formed so as to extend concentrically about the axis of rotation. Within the meaning of the invention, this arc can also be referred to as a "guide arc" and should be understood as a virtual arc.

In this case, it is expedient if the link element is rigidly arranged on the seat, for example on a seat substructure, and in particular cannot move together with the adjustment device. It is further expedient if the operator device and the shaft are connected by means of an intermediate element, this intermediate element being formed, for example, as a housing part. Additional elements, such as electronic components, power supply or the controller for the operator device, are arranged within or on said intermediate element, for example. It is also expedient if the shaft can be mounted by means of a bearing element of said intermediate element.

In addition, it is advantageous if, for example, the axis of rotation is formed by means of the central axis of a second shaft or of a bush, and/or the axis of rotation is arranged so as to be rotatable about itself with respect to the rest of the vehicle seat but to otherwise not be displaceable in any direction. For example, the axis of rotation is mounted in a connecting piece or retaining part, which is in turn rigidly or fixedly connected to the seat substructure.

In the process, it is advantageous for the guide element to be shaped substantially as a double trapezium in relation to a cross section perpendicular to the central axis of the shaft. The term "double trapezium" should be understood to mean that two trapeziums are joined together at their respective first baselines, preferably at their respective bases (i.e. the longer baseline of the two), and thus form the shape of a double trapezium. Advantageously, the two trapeziums are congruent with one another. In addition, the two trapeziums are preferably both isosceles trapeziums. In addition, preferably the two trapeziums are free of a right angle.

Particularly preferably, the second baseline of the trapeziums is the smaller of the two baselines. In this case, it is preferable for the second baseline to not be linear, but rather to be formed as an arcuate segment, the two arcuate segments formed by the two second baselines of the two trapeziums preferably being positioned on a common virtual circle, the center point of which is preferably positioned on the common first baseline of the two trapeziums. It is particularly preferable for the double trapezium to have a first axis of symmetry, formed for example by the common first baseline. It is also preferable for the double trapezium to have a second axis of symmetry, which extends for example through the center point of the common first baseline, i.e. the point at half the segment length of the common first baseline, and is formed perpendicularly to the common first baseline.

Overall, therefore, the double trapezium preferably has six corners, two first corners bordering the common first baseline and two second corners each bordering one of the second baselines. Said double trapezium also has six lateral edges, a first lateral edge forming a second baseline and two second lateral edges being arranged between each end of the two first lateral edges in each case. It follows from the above description that one end of the common baseline is arranged on each of the two common ends of the two second lateral edges.

Within the above-described first part of the guide link, therefore, the guide element can be pivoted about a particular angle in a mechanically securely guided manner. In this case, it is preferable if the common first baseline of the two trapeziums can be arranged perpendicularly to the guide arc during each pivot process of the shaft about the axis of rotation. These positions (reference positions B) thus belong to the "adjustment positions" of the guide element. Preferably, the reference positions B are the only adjustment positions of the guide element. It is conceivable that the number of adjustment positions is at least theoretically unlimited since, when the guide element is in one of its adjustment positions, it can be moved smoothly from an uppermost portion of the guide link to a lowermost portion of the guide link by means of the shaft pivoting about the axis of rotation within the first part.

It is also preferable for the guide link to comprise second parts which are arranged so as to adjoin the at least one first part of the guide link and are substantially triangular. In this case, it is preferable for at least one second part to be arranged on both boundary sides of the first part, the two boundary sides being based on a position radially in front of the guide arc and a position radially behind the guide arc.

Preferably, a plurality of second parts are arranged one after the other in a circumferential direction of the guide arc on both sides of the first part, the number of second parts advantageously being the same on both sides of the first part.

Advantageously, the number of second parts on one side corresponds to the number of locked positions of the guide element. Preferably, therefore, the present adjustment device is formed having steps, since it preferably has a predetermined number of locked positions. Preferably, it does not have a step-free design.

It is also preferable if a first side of the substantially triangular second part, more preferably along its entire length, directly adjoins the first part. Furthermore, a second side of the second part is preferably linear. In addition, a third side of the second part is preferably arcuate, the arc drawn by means of the third side preferably bulging outwards starting from the second part. It is advantageous if the second and third side of the second part are each connected by means of an edge in the shape of a circular arc portion. In addition, the second and/or third side preferably each form contact with the first side and thus with the first portion by means of just one of their corners.

Additionally, it is preferable for the second parts to be arranged such that, when viewed in the circumferential direction of the guide arc in each case, the second side of the second part is arranged on a first of the boundary sides first, followed by the third side of the second part, and the third side of the second part is arranged on a second of the boundary sides first, followed by the second side of the second part. Also preferably, all the second parts are spaced apart from one another.

In cooperation with the first part, the guide element can be rotated and/or mounted within said second parts. In the process, the mounting of the guide element is preferably formed by means of a stop between at least one of the second sides of the second part of the guide link and one of the second lateral edges of the double trapezium of the guide element. The preferably linear design of the second sides of the second part is thus advantageous since the stop is better formed between the guide link and the guide element and can be stabilized by the bearing forces that can be provided by means of the second side.

The height of the operator device can also be adjusted by rotating the guide element within the guide link until it reaches one of the adjustment positions. Next it can be pivoted following the first portion until it reaches a position at which a locked position of the guide element can be set. By pivoting the guide element within the first and second part, preferably only about its own central axis, it can change from the adjustment position into one of the locked positions.

It can be understood that the shaft and thus the entire operator device is pivoted together with the guide element when said element is pivoted along the guide arc within the first part. Preferably, the operator device does not pivot when the guide element pivots within the first and second part.

According to a preferred variant, a third part of the guide link is provided, said part being circular and formed so as to overlap the first and/or second parts. This third part is used to simplify the assembly of the adjustment device if the shaft can advantageously be guided through the guide link, and in particular through the third part of the guide link, from the side of the link element.

Preferably, the guide element can be arranged within the guide link such that at least one second baseline, formed as an arcuate segment, of the double trapezium is concentric with one of the arcuate third sides of the second part. These positions (reference positions A) belong to the positions in which the guide element can be locked within the guide link and which can thus be referred to as locked positions. Preferably, the reference positions A are the only locked positions of the guide element. The arcuate shape of the two sides, i.e. the second baseline of the double trapezium of the guide element and the third side of the second part of the guide link, is thus advantageous since the guide element is thus rotatably mounted, or can be rotated, about its own axis without any collisions within the guide link.

In addition, the above-described sequence of the second and third sides of the second parts of the guide link on both sides of the guide arc is advantageous since this arrangement ensures that a stop option and/or mounting option is provided on both sides of the common first baseline of the guide element. It is also advantageous since, on both sides adjacently to the two baselines of the guide element, a guide link shape is provided that complements the shape of the guide element at least in this region; as described above, this simplifies rotation of the guide element about the central axis of the shaft in order to reach the latching position.

Preferably, therefore, the guide element can be pivoted at least about the central axis of the shaft within the first and second parts of the guide link, at least two, preferably three, locked positions of the guide element being defined within the guide link.

Also advantageously, the locked positions of the guide element are defined by guide element outer surfaces being in direct contact with guide link outer surfaces that are at an angle to the arc.

Simply due to the mounting of the guide element, therefore, a type of locking is possible by means of the stop on the guide link. It is preferable, however, if a threaded nut can interact with an external thread of the shaft, which thread is arranged adjacently to the guide element, and in particular can be fixed against a first outer surface of the guide link by means of a washer. This thus provides secure locking of the position of the adjustment device.

To simplify the operation of the adjustment device, it is advantageous if a driving disc can be arranged between a second outer surface of the guide link and a flanged disc in a non-rotational manner with respect to the shaft, the driving disc having a handle element on at least one circumferential point. For example, the handle element is in the form of a substantially rectangular metal tab canted simply by an angle of 90°. Said tab can also be formed having rounded portions at the corners. Preferably, the handle element is arranged in direct contact with an outer circumference of the driving disc.

Preferably, the second outer surface of the link element is arranged opposite the first outer surface of the link element.

For example, an additional shaft element is arranged so as to adjoin the guide element in the axial direction of the shaft and is fixedly connected to the guide element. For example, the driving disc can be arranged on the additional shaft element by means of a connection consisting of feather keys and corresponding keyways. Alternatively, the driving disc can be welded to the additional shaft element.

In the process, by means of the handle element, the driving disc makes it possible to indirectly detect the position of the guide element on the basis of the extent of its rotation in the circumferential direction of the shaft. This is possible since the driving disc is arranged in a non-rotational manner with respect to the shaft and thus with respect to the guide element; in other words, according to the present invention, it is thus advantageously provided that a relative position of the handle element with respect to the guide element is unchangeable and/or fixed at least in the circumferential direction.

For example, an angle between a virtual first plane, spanned by the central axis of the shaft and by a central axis or axis of symmetry of the handle element, and a virtual second plane, spanned by the central axis of the shaft and an axis perpendicular to the common first baseline of the two trapeziums of the double trapezium, has a value from a range of 0 to 90°, preferably of 45°.

The above-described rigid relative position is expedient since in some cases the user may not be able to see the guide element directly when adjusting the adjustment device, i.e. when moving the guide element within the guide link, since said element is arranged, for example, so as to be at least partly hidden by the guide element and/or operator device.

On the basis of the angular position of the handle element relative to the rest of the vehicle seat or, for example, relative to a mark on the second outer surface, the user can however identify the angular position in which the guide element is located, and in particular whether the guide element is in one of the locked positions or in one of the adjustment positions. Preferably, therefore, an angular position of the guide element can be determined by detecting the angular position of the handle element on the basis of a pivot about the shaft fixedly connected to the guide element.

In the process, the mark on the second outer surface, formed for example as a laser mark, can comprise a first marking line, denoting at least one of the locked positions, and/or a second marking line, denoting at least one of the adjustment positions. In this case for example, it is possible, when there are a total of three possible locked positions, for at least one locked position to represent the middle locked position in relation to the guide element pivoting along the first portion of the guide link. The same applies similarly to the at least one adjustment position.

Advantageously, when the guide element is located in the locked position according to the reference position A (first marking line) or in the adjustment position according to the reference position B (second marking line), said marking lines each extend in parallel with the guide element axis perpendicular to the common first baseline of the two trapeziums of the double trapezium. For example, the two lines form an angle of 45° to one another.

According to an alternative embodiment, said marking lines advantageously extend such that they denote the position into which the user must rotate the handle element in order to set either the locked position or the adjustment position of the guide element. For this purpose, it is possible to orient each marking line in parallel with the course that the virtual first plane must take, projected onto the link element, when the guide element is intended to be in one of the reference positions A or in one of the reference positions B.

The handle element also allows the user to rotate the shaft and thus the guide element fixedly connected thereto by means of rotating the handle element.

It is advantageous if the flanged disc is arranged in the direction of the central axis of the shaft and is fixedly connected to the guide element. For example, the flanged disc can be indirectly connected to the guide element by means of the additional shaft element. Advantageously, the flanged disc acts as a counter-bearing to the driving disc in the axial direction of the shaft.

The assembly comprising the flanged disc, the additional shaft element, the guide element and/or the shaft is referred to as the shaft module within the meaning of the present invention. As described above, all the elements of this shaft module are advantageously fixedly interconnected.

BRIEF DESCRIPTION OF THE DRAWINGS

Additional advantages, aims and characteristics of the present invention will be explained on the basis of the accompanying drawings and following description, which show and describe a vehicle seat comprising an adjustment device according to the invention by way of example. In the drawings.

DETAILED DESCRIPTION

Figure 1A:
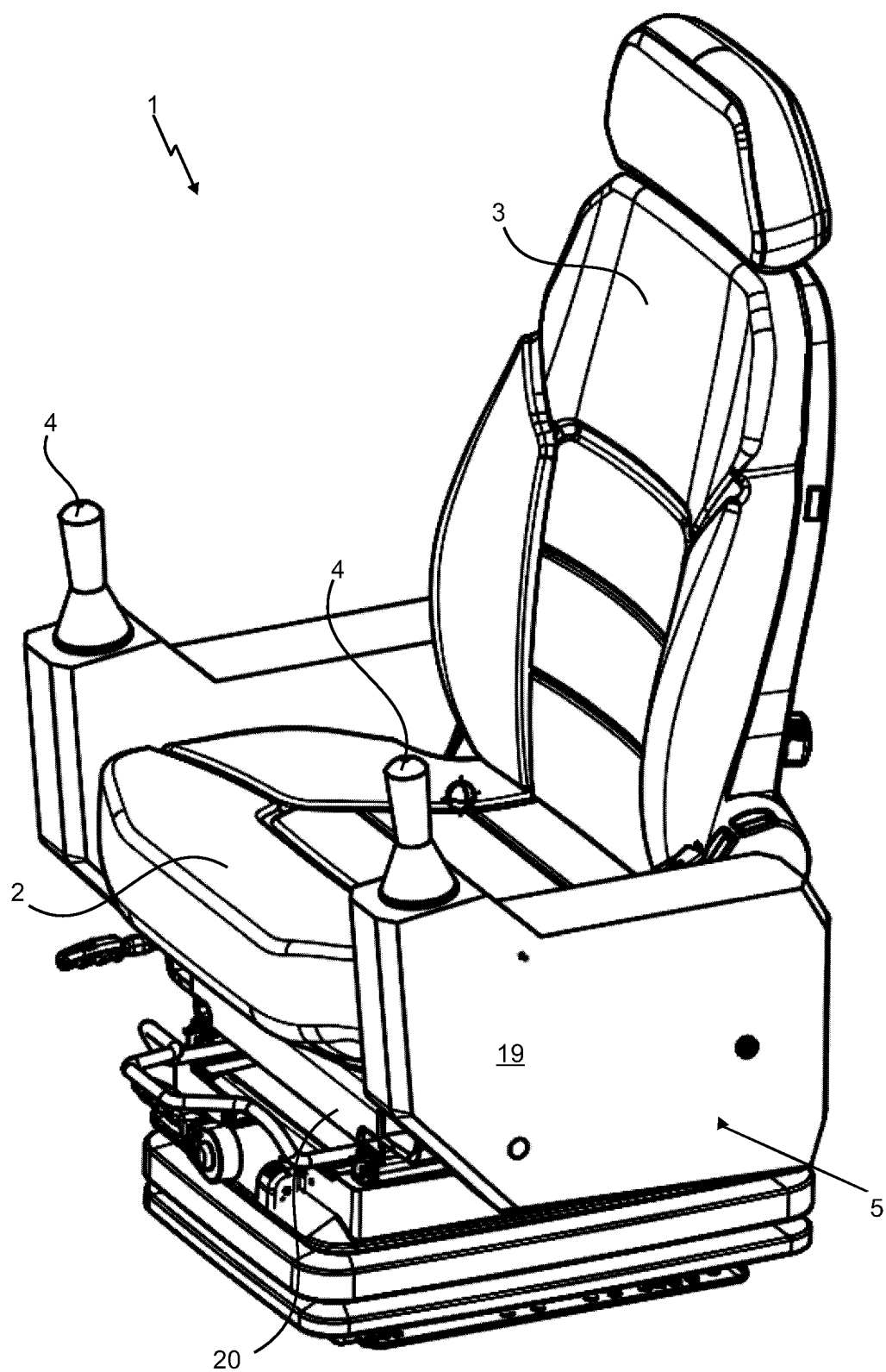
FIG. 1a-c are various schematic views of a vehicle seat comprising an operator device and an adjustment device.
Figure 1B:
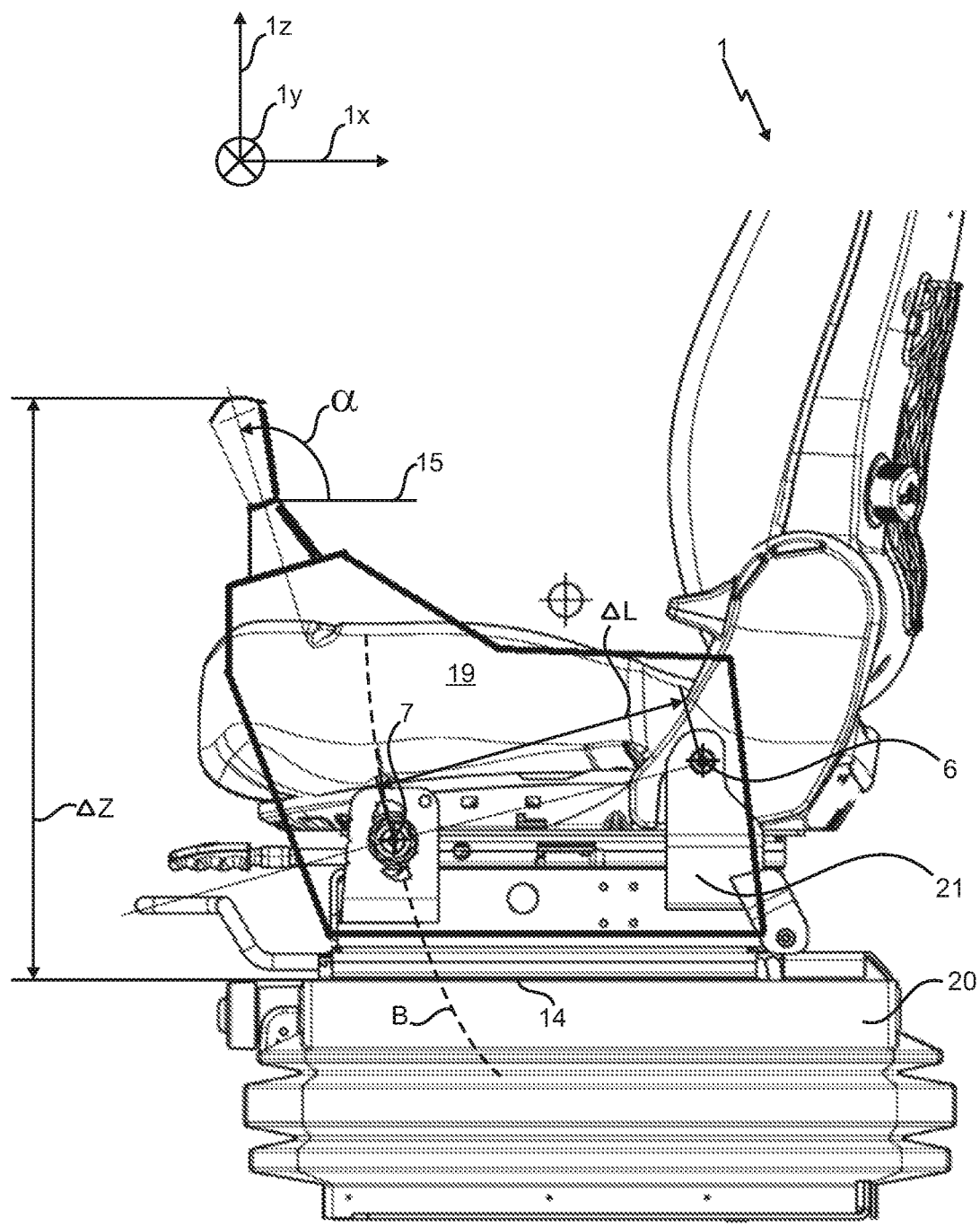
Figure 1C:
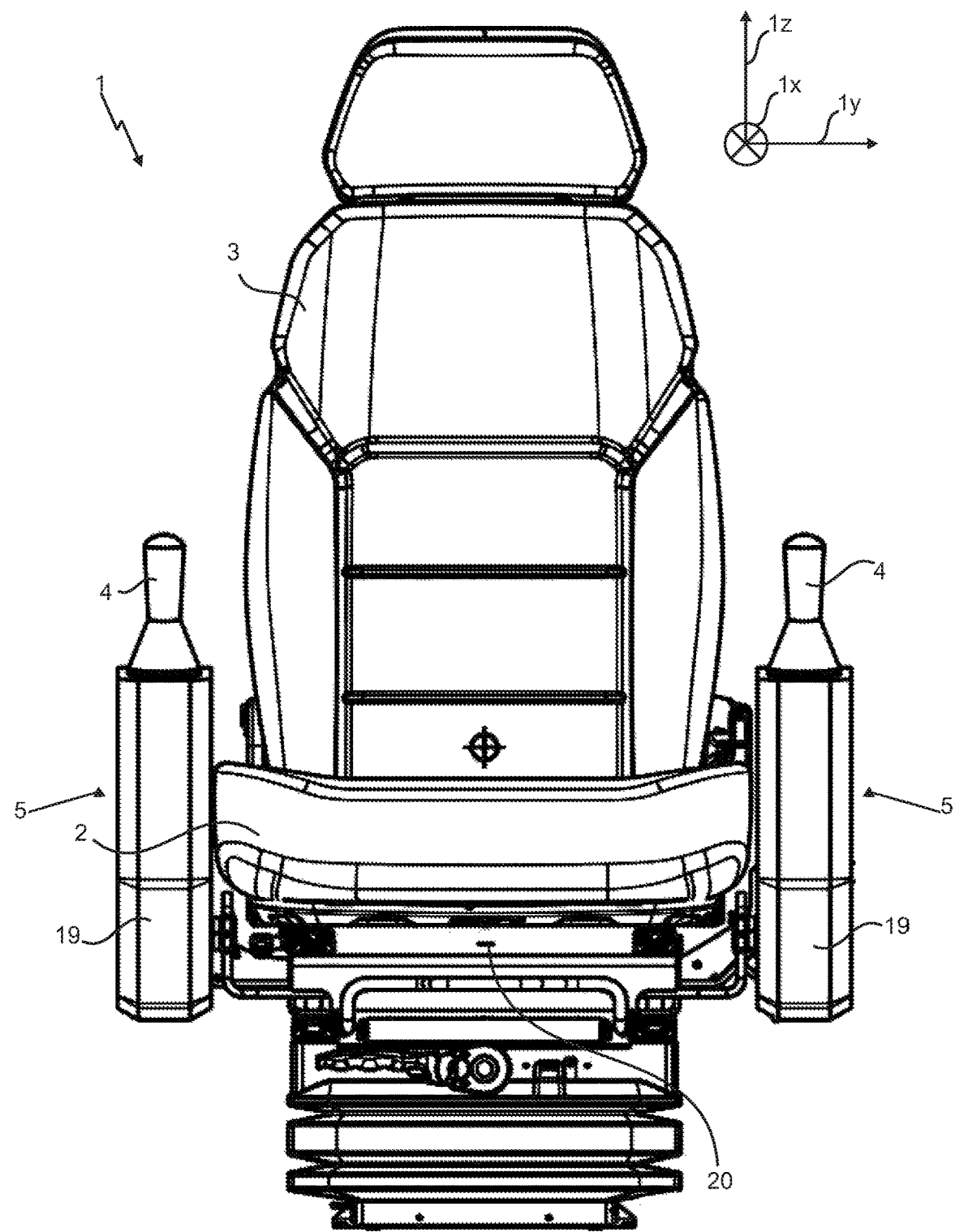

FIG. 1a to 1c show a possible embodiment of the vehicle seat according to the invention. The coordinate system shown illustrates the seat longitudinal direction 1x, the seat width direction 1y and the seat vertical direction 1z.

By way of example, the vehicle seat 1 comprises a seat part 2 and a backrest part 3. On both sides of the vehicle seat 1, there is an operator device 4 for operating vehicle seat and/or vehicle functions (in this case in the form of a joystick) and an adjustment device 5 or adjusting a vertical position and/or a tilt level of the operator device 4.

It should be noted first that FIGS. 1a and 1c show both sides of the vehicle seat 1. FIG. 1b, 2b, 2d, 2e, 3a-3f, 4a, 4c and 5b show the left side of the vehicle seat 1 from the viewpoint of the seat occupant. FIGS. 2a, 2c, 4b and 5a show the right side of the vehicle seat 1 from the viewpoint of the seat occupant.

In the figures, a distance Δz is illustrated between a highest point of the operator device 4 and a horizontal reference surface 14 that is fixed with respect to the seat substructure, as well as an angle α between a central axis of the operator device 4 and a reference plane 15, which is parallel to the reference surface 14 and can be used as a reference for the vertical position and/or tilt level of the operator device 4.

In the present case, the link element 10 is rigidly arranged on a seat substructure 20 and cannot move or pivot together with the adjustment device 5. In addition, the operator device 4 and the shaft 7 are connected by means of an intermediate element 19, this intermediate element 19 being formed as a housing part in this case. Within this housing part, for example, additional elements (not shown) such as the electronic components, the power supply or a control unit assigned to the operator device 4 are arranged.

According to the invention, the adjustment device 5 comprises an axis of rotation 6 extending in the seat width direction 1y, and a shaft 7 which is connected to the operator device 4, is spaced apart from the axis of rotation 6 and arranged so as to be pivotable about this axis together with the operator device 4. In the present case, the axis of rotation 6 is formed by means of a central axis of a second shaft and is mounted in a retaining part 21. The retaining part 21 is rigidly connected to the seat substructure 20. The axis of rotation 6 is thus arranged so as to be rotatable about itself with respect to the rest of the vehicle seat 1 but to otherwise not be displaceable in any direction.

In the process, a distance ΔL (see FIG. 1b) between the axis of rotation 6 and the shaft 7 is permanently fixed and the axis of rotation 6 is arranged behind the shaft 7 in the seat longitudinal direction 1x and above the shaft 7 in the seat vertical direction 1z.

FIG. 1b shows a virtual arc B, which is arranged so as to extend concentrically about the axis of rotation 6 and represents the guide arc.

Figure 2A:
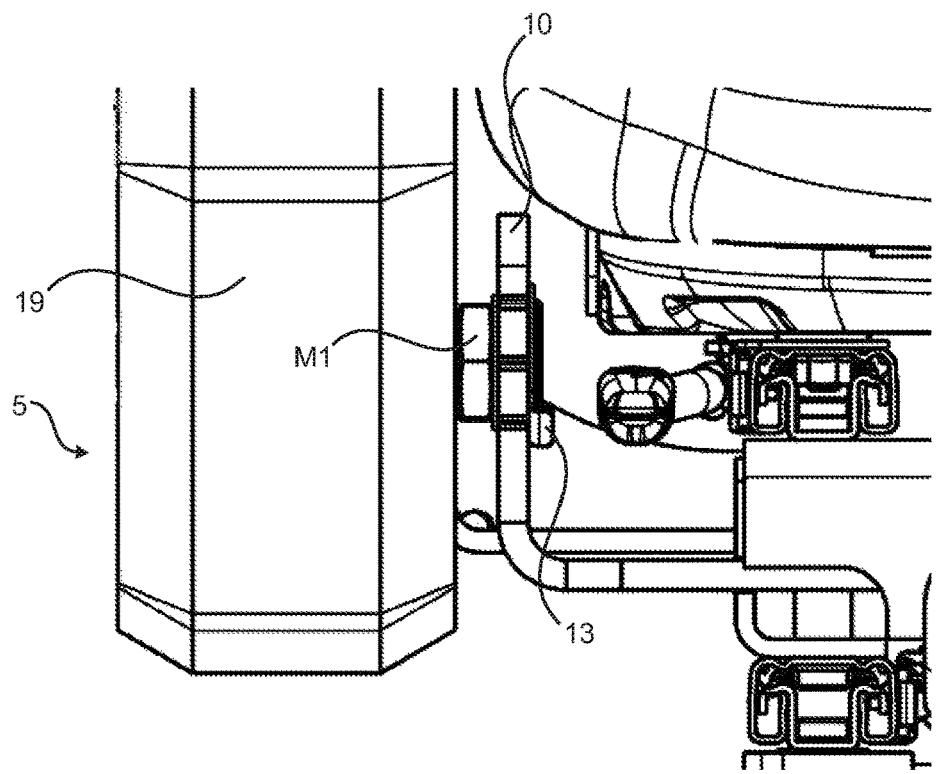
FIG. 2a-e are various schematic detailed or cross-sectional views of the adjustment device from FIG. 1.
Figure 2B:
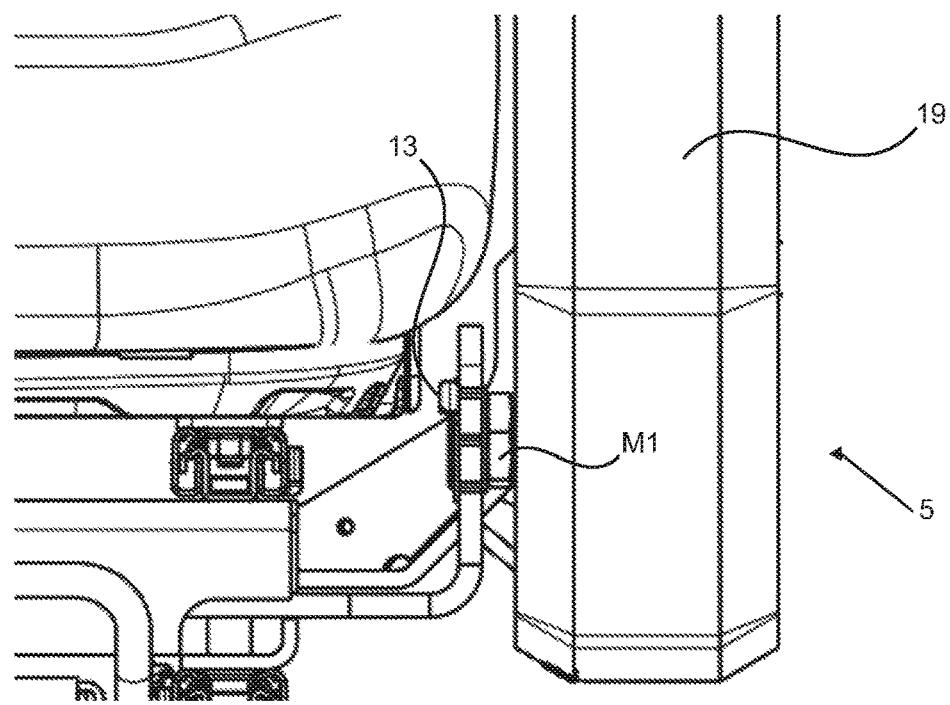
Figure 2C:
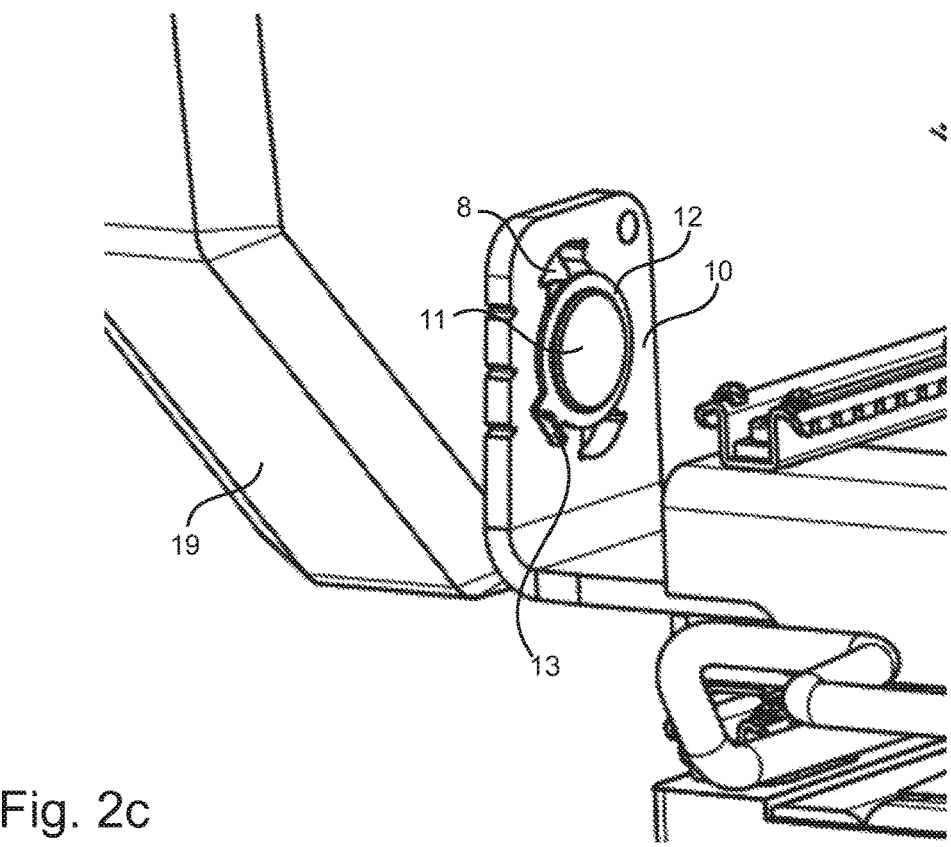
Figure 2D:
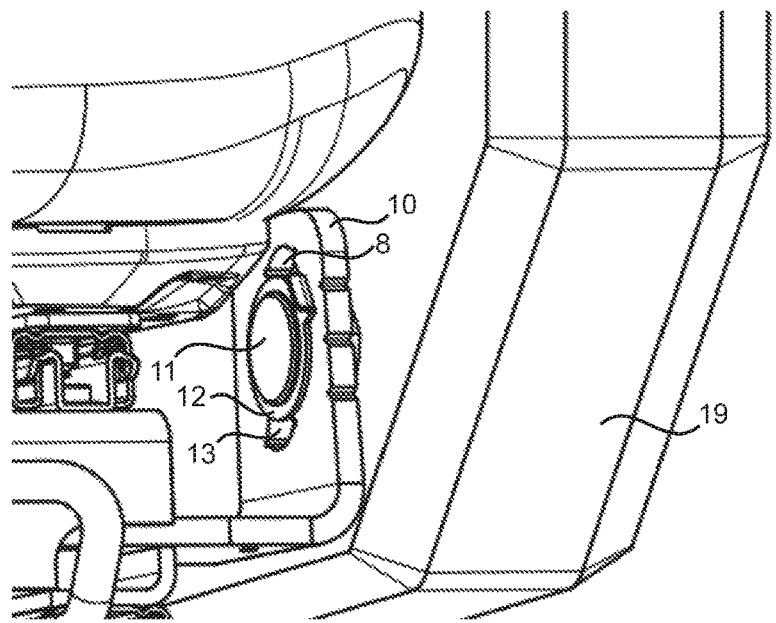
Figure 2E:
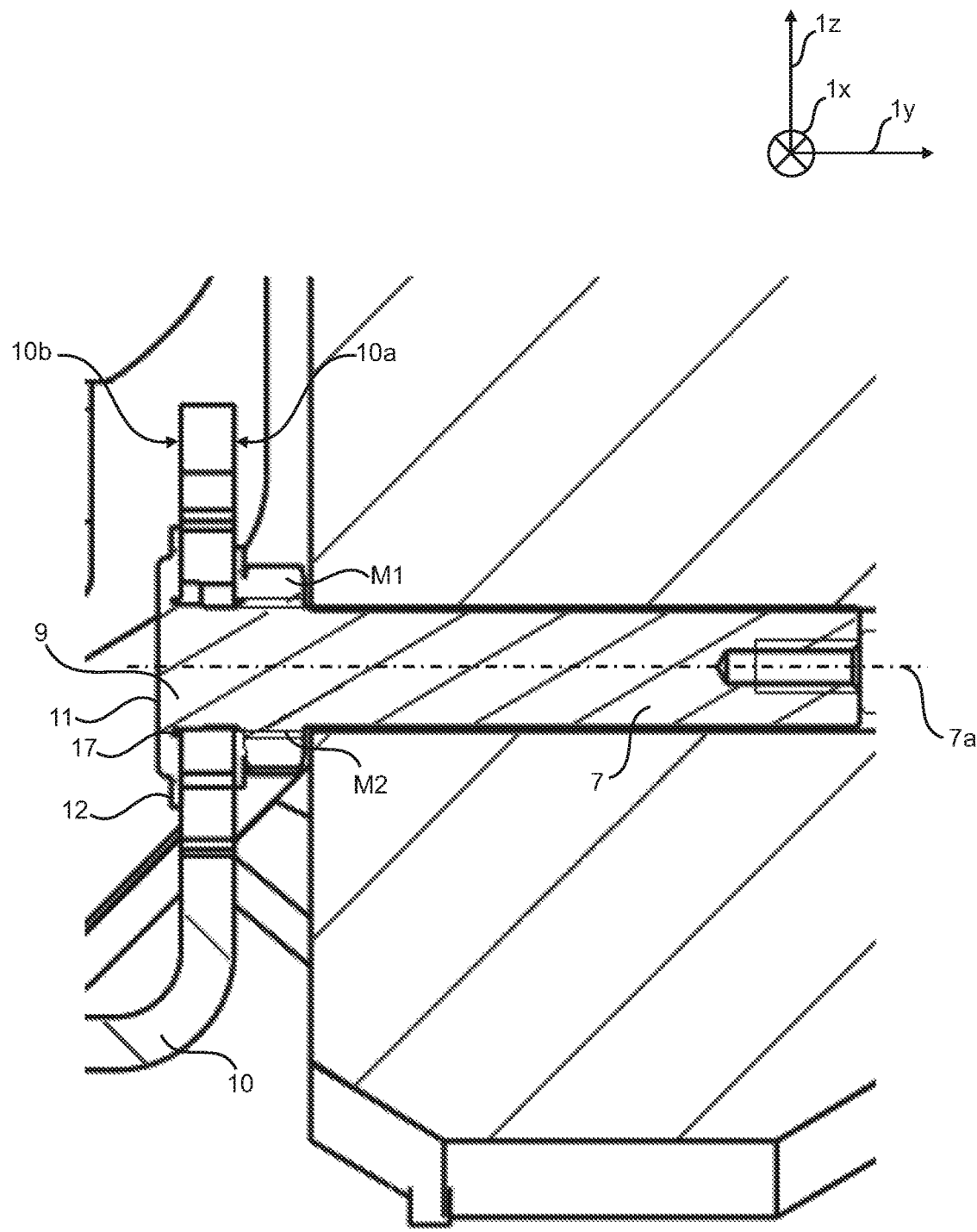
Figure 3A:
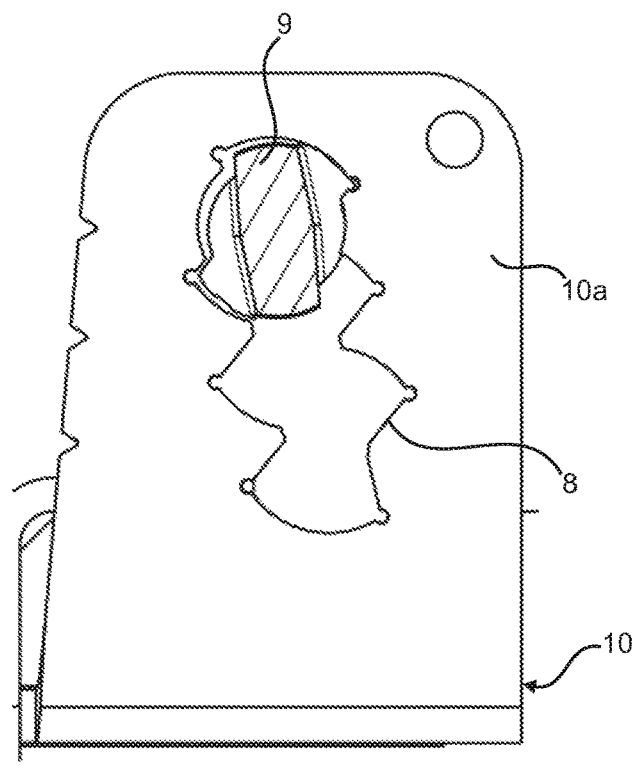
FIG. 3a-f are schematic views of the adjustment device from FIG. 1 with the operator device hidden and showing a number of adjustment positions of said adjustment device.
Figure 3B:
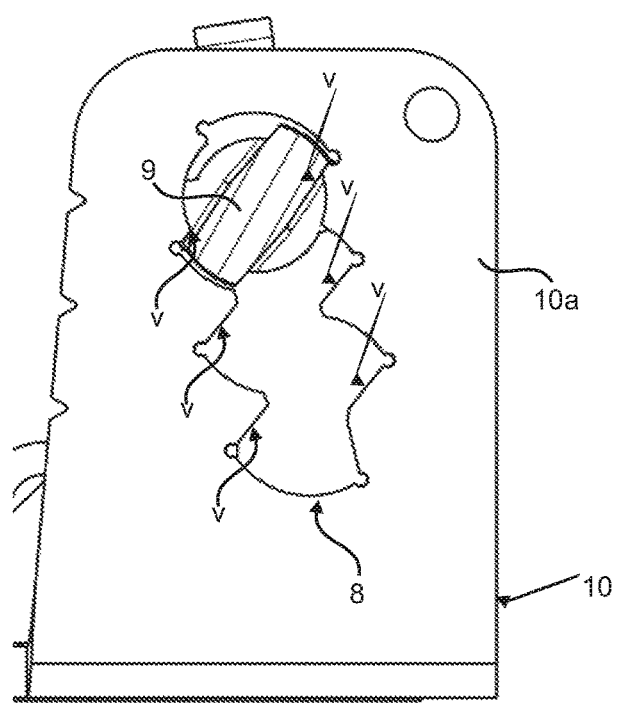
Figure 3C:
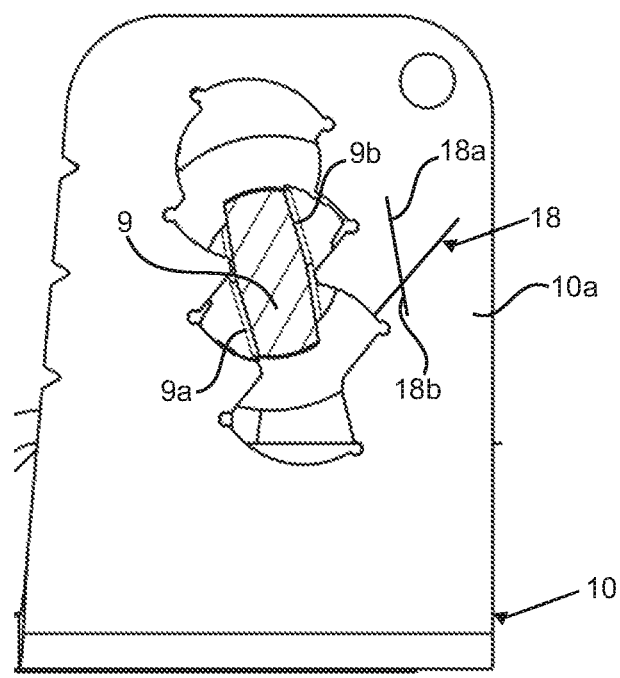
Figure 3D:
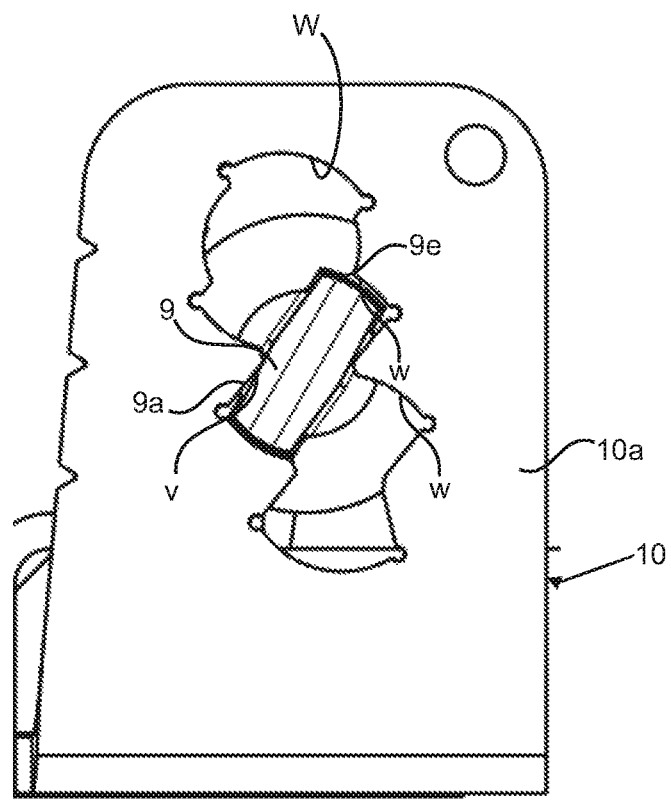
Figure 3E:
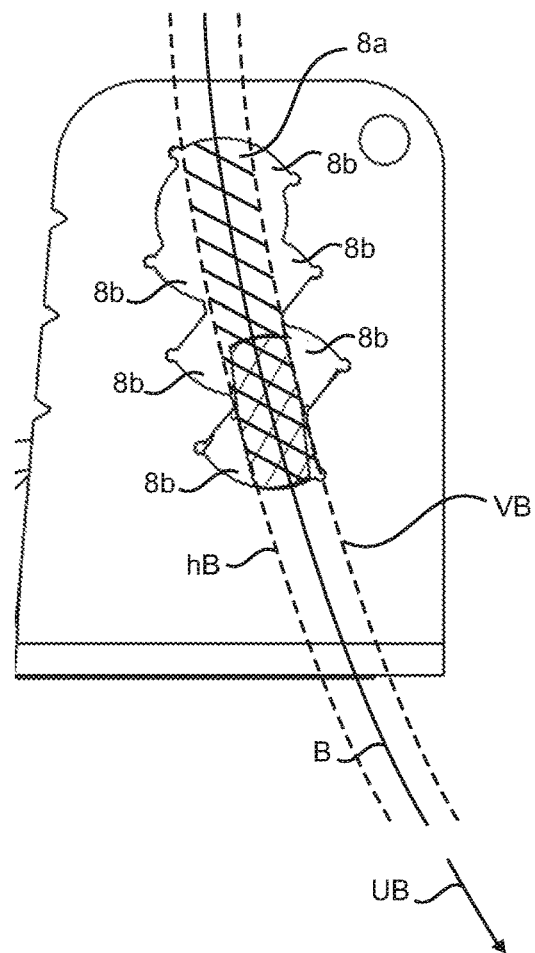
Figure 3F:
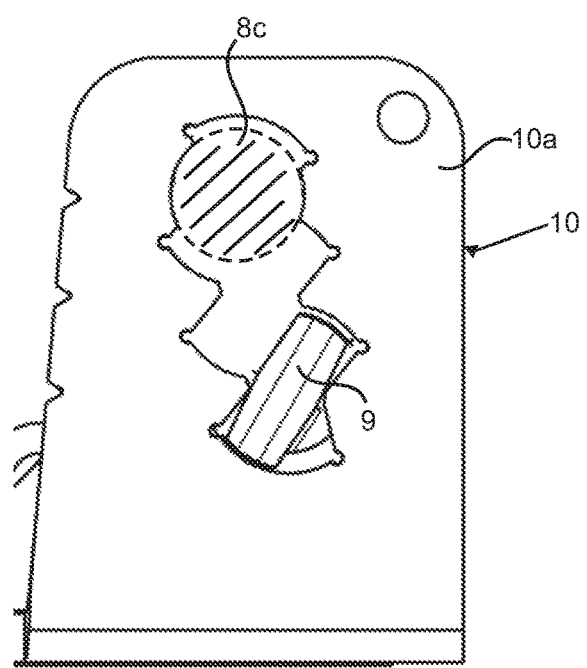

It is clear from FIGS. 2e and 3a to 3f in particular that a guide element 9, arranged in the direction of a central axis 7a of the shaft 7 and fixedly connected to the shaft 7, can move within a guide link 8 of a link element 10 with respect to the shaft 7 pivoting about the axis of rotation 6, the guide link 8 having a first part 8a shaped so as to extend along a portion of the arc B (see also FIG. 3e). A circumferential direction UB of the arc B is also illustrated.

According to the embodiment shown, the guide link 8 also has second parts 8b, which are arranged so as to adjoin the at least one first part 8a and are substantially triangular (see in particular FIG. 3e).

In the present case, the guide element 9 can be pivoted at least about the central axis 7a of the shaft 7 within the first 8a and second parts 8b of the guide link 8, three locked positions of the guide element 9 being defined within the guide link 8. These are illustrated according to FIGS. 3b, 3d and 3f and defined by outer surfaces 9a, 9b of the guide element 9 (see FIG. 3c) being in direct contact with outer surfaces v of the guide element 8 that are at an angle to the arc B (see FIG. 3b and FIG. 6b).

For reasons of clarity, the outer surfaces 9a, 9b and v are not illustrated in each figure. When the guide element 9 rotates by 180°, the outer surfaces 9a and 9b shown are interchangeable in terms of their stop function.

Figure 6A:
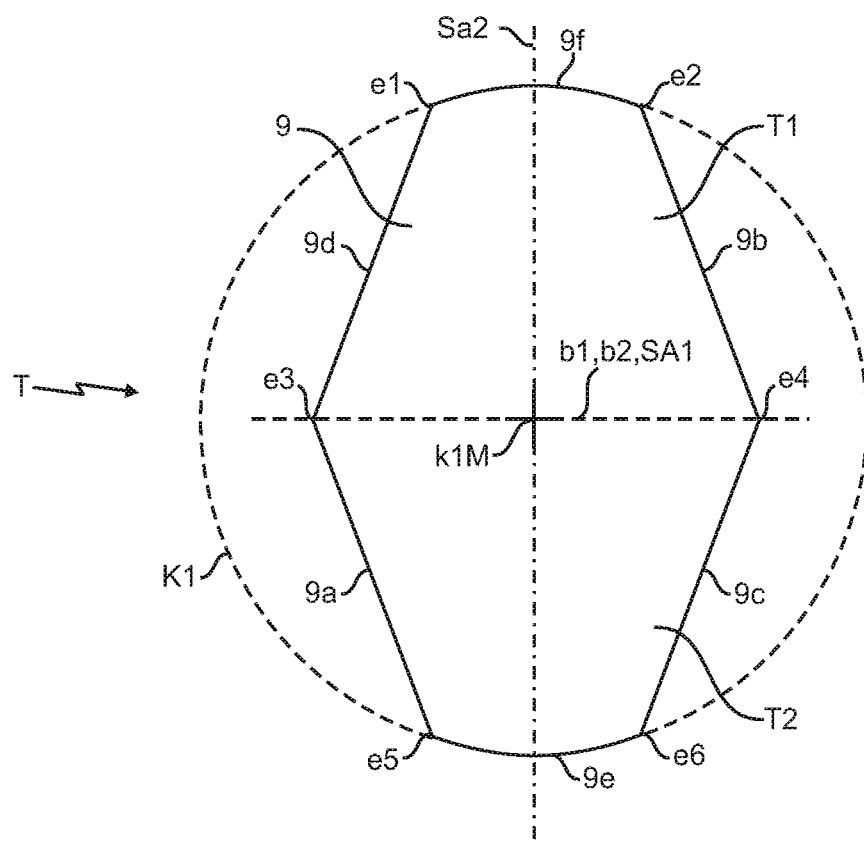
FIG. 6a is a detailed view of a cross section of the guide element.

In the present case, a cross section of the guide element 9 perpendicular to the central axis 7a of the shaft 7 (according to FIGS. 3a to 3f) is shaped substantially as a double trapezium T (see in particular the detailed view according to FIG. 6a). Accordingly, two trapeziums T1, T2 are joined together at their respective first baselines b1, b2 (in this case at their respective bases, i.e. the longer baseline of the two baselines) and thus form the double trapezium. The two trapeziums T1, T2 are congruent with one another. In addition, the two trapeziums T1, T2 are each isosceles trapeziums; the lateral edges formed by the outer surfaces 9a and 9c and the lateral edges formed by the outer surfaces 9d and 9b are the same length as one another, respectively. In addition, the two trapeziums T1, T2 are free of a right angle.

In the present case, the second baseline of the trapeziums T1, T2, which is formed by the outer surfaces 9e, 9f, is the smaller of the two baselines 9e, 9f, b1, b2. In this case, this second baseline is not linear, but rather is formed as an arcuate segment, the two arcuate segments formed by the two second baselines being positioned on a common virtual circle K1, the center point K1M of which is preferably positioned on the common first baseline b1, b2 of the two trapeziums T1, T2.

In total, the double trapezium T thus preferably has six corners e1, e2, e3, e4, e5, e6, two first corners e3, e4 bordering the common first baseline b1, b2 and two second corners e1, e2; e5, e6 forming one of the two baselines (see outer surfaces 9e, 9f). Said double trapezium also has six lateral edges, which are formed by the outer surfaces 9a, 9b, 9c, 9d, 9e, 9f, a first lateral edge (outer surfaces 9e, 9f) forming a second baseline and two second lateral edges (outer surfaces 9a, 9d; 9c, 9b) being arranged between each end of the two first lateral edges or each corner e1, e2; e5, e6 in each case. It follows from the above description that one end of the common baseline b1, b2 is arranged on each of the two common ends e3, e4 of the two second lateral edges.

Within the first part 8a, therefore, the guide element 9 can be pivoted about a particular angle in a mechanically securely guided manner. In this case, the common first baseline b1, b2 of the two trapeziums T1, T2 can be arranged perpendicularly to the guide arc B during each pivot process of the shaft 7 about the axis of rotation 6.

According to FIG. 3e, it is shown that three second parts 8b are arranged on both boundary sides of the first part 8a, the two boundary sides being based on a position radially in front of the guide arc B and a position radially behind the guide arc, which is illustrated by means of two virtual arcs hB, vB in this case. The arcs hB, vB and thus the boundary sides of the first part 8a each extend concentrically with the arc B.

A plurality of second parts 8b are thus arranged one after the other in a circumferential direction UB of the guide arc B on both sides of the first part 8a, the number of second parts 8b being the same on both sides of the first part 8a and preferably being three. The number of second parts 8b on one side of the first part 8a thus corresponds to the number of locked positions of the guide element 9.

The present adjustment device 5 is thus formed having steps and in this case has three steps. Logically, therefore, the device does not have a step-free design.

Figure 6B:
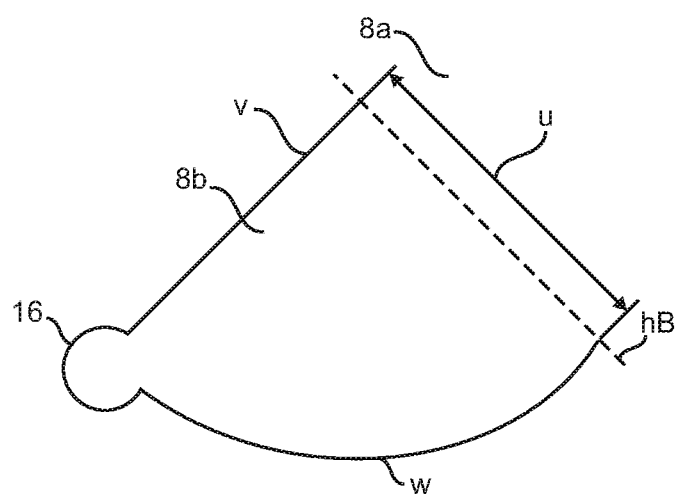
FIG. 6b is a detailed view of the second part of the guide link.

FIG. 6b shows an enlarged view of a transition between one of the second parts 8b and the first part 8a according to FIGS. 3a to 3f. In this case, a first side u of the substantially triangular second part 8b is formed directly adjoining the first part 8a; in the process, the boundary is formed by a portion of the virtual arc hB. A second side (formed by means of the outer surface v) of the second part 8b is linear. A third side (formed by means of the outer surface w) of the second part 8b is arcuate. The second and third side of the second part 8b are connected by means of an edge 16 in the shape of a circular arc portion. If the guide link 8 is advantageously produced by means of a laser cut in the link element 10, providing this edge 16 helps prevent the formation of defects in the transition between the second and third side. In this respect, particularly relevant flaws are unwanted protrusions on the edging of the guide link 8, which could hamper the movement of the guide element 9 within the guide link 8.

It is clear from FIGS. 3a to 3f and FIG. 6b that the second parts 8b are arranged such that, when viewed in the circumferential direction UB of the guide arc B in each case, the second side of the second part 8b is arranged on a first hB of the boundary sides hB, vB first, followed by the third side of the second part 8b, and the third side of the second part 8b is arranged on a second vB of the boundary sides hB, vB first, followed by the second side of the second part 8b. It can also be seen that the second parts 8b are spaced apart from one another.

In cooperation with the first part 8a, the guide element 9 can be rotated and/or mounted within said second parts 8b. In the process, the mounting of the guide element 9 is formed by means of a stop between at least one of the second sides (formed by outer surfaces v) of the second part 8b of the guide link 8 and one of the second lateral edges (formed by outer surfaces 9a, 9b) of the double trapezium T of the guide element 9 (see in particular FIG. 3d).

A third part 8c of the guide link 8 is provided, said part being circular and formed so as to overlap the first 8a and/or second parts 8b. This third part 8c (illustrated according to FIG. 3f in the form of a hashed circular area) is used to simplify the assembly of the adjustment device 5 since the shaft 7 can be guided through the guide link 8, and in particular through the third part 8c of the guide link 8, from the side of the link element 10.

In the present case, the guide element 9 can be arranged within the guide link 8 such that at least one second baseline, formed as an arcuate segment (see outer surfaces 9e, 9f), of the double trapezium T is concentric with one of the arcuate third sides w of the second part 8b (see in particular FIG. 3d).

Figure 4A:
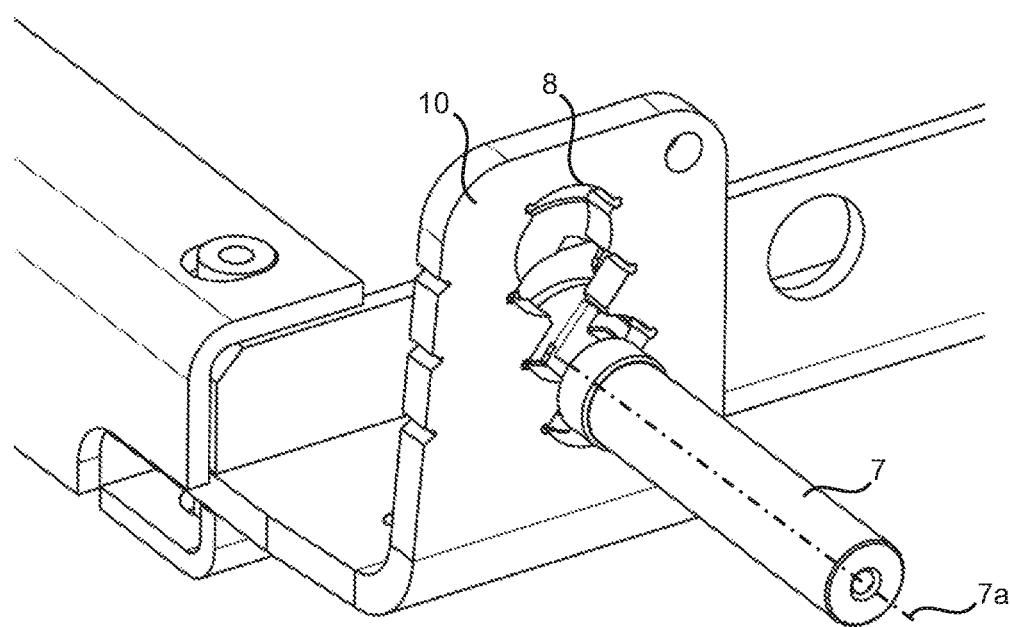
FIG. 4a-c are schematic perspective views of the adjustment device from FIG. 1 with the operator device hidden.
Figure 4B:
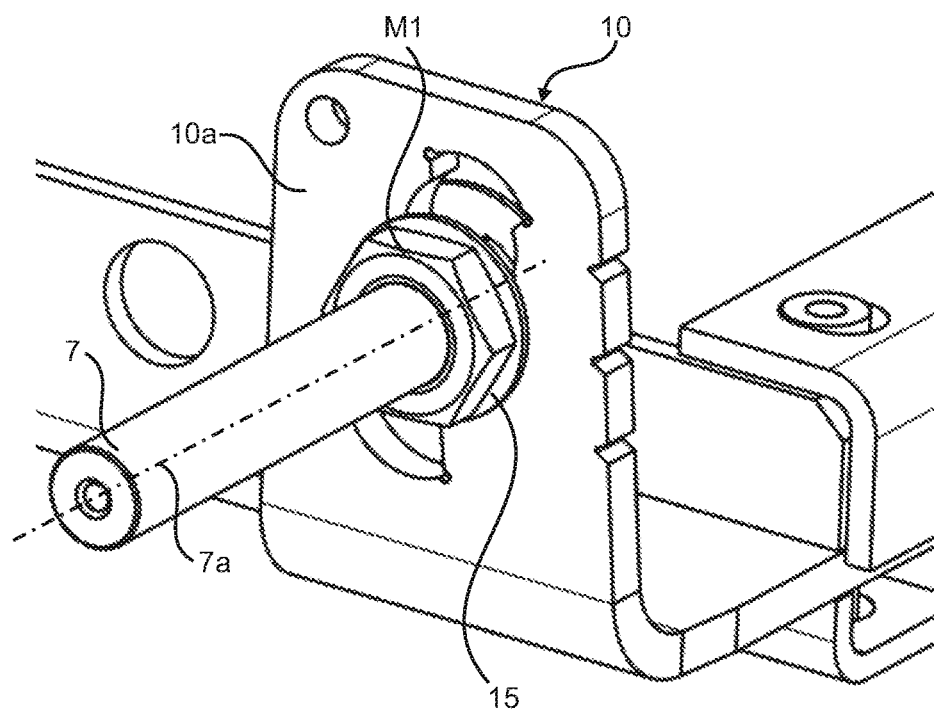
Figure 4C:
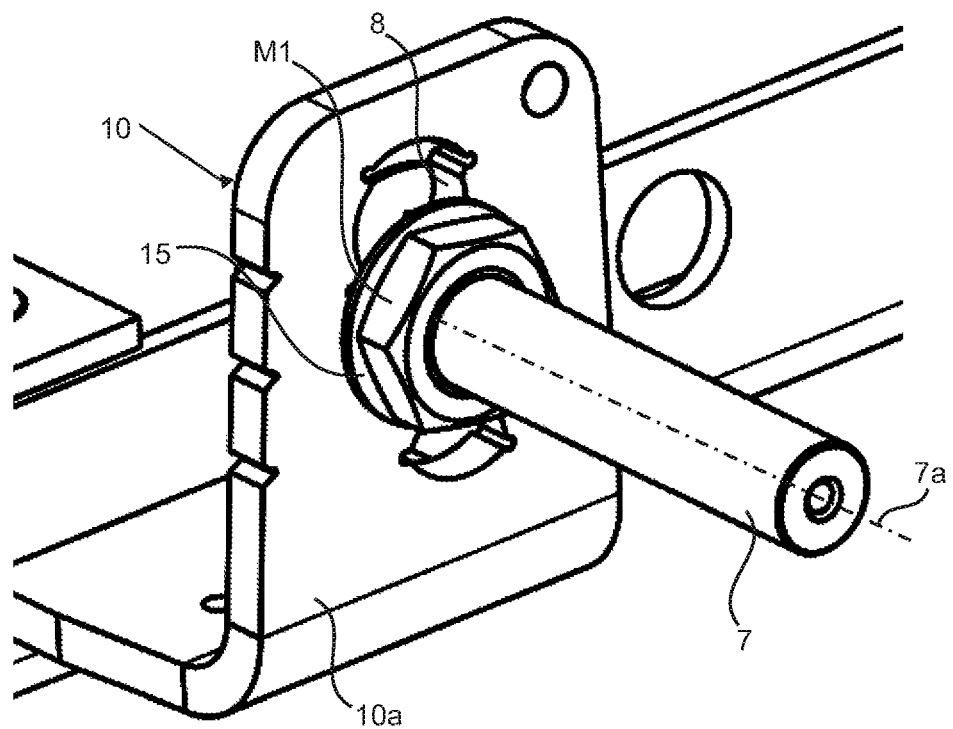

According to FIGS. 2e, 4b and 4c in particular, it is shown that a threaded nut M1 can interact with an external thread M2 of the shaft 7, which thread is arranged adjacently to the guide element 9 (see FIG. 2e), and can be fixed against a first outer surface 10a of the guide link 10 by means of a washer 15.

Figure 5A:
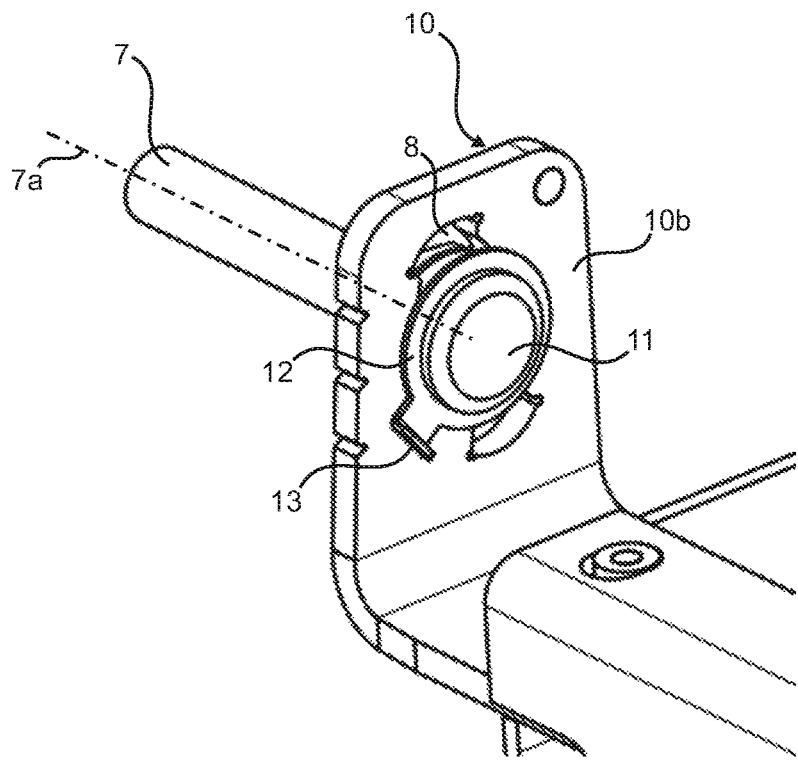
FIGS. 5a and b are further schematic perspective views of the adjustment device from FIG. 4a-c.
Figure 5B:
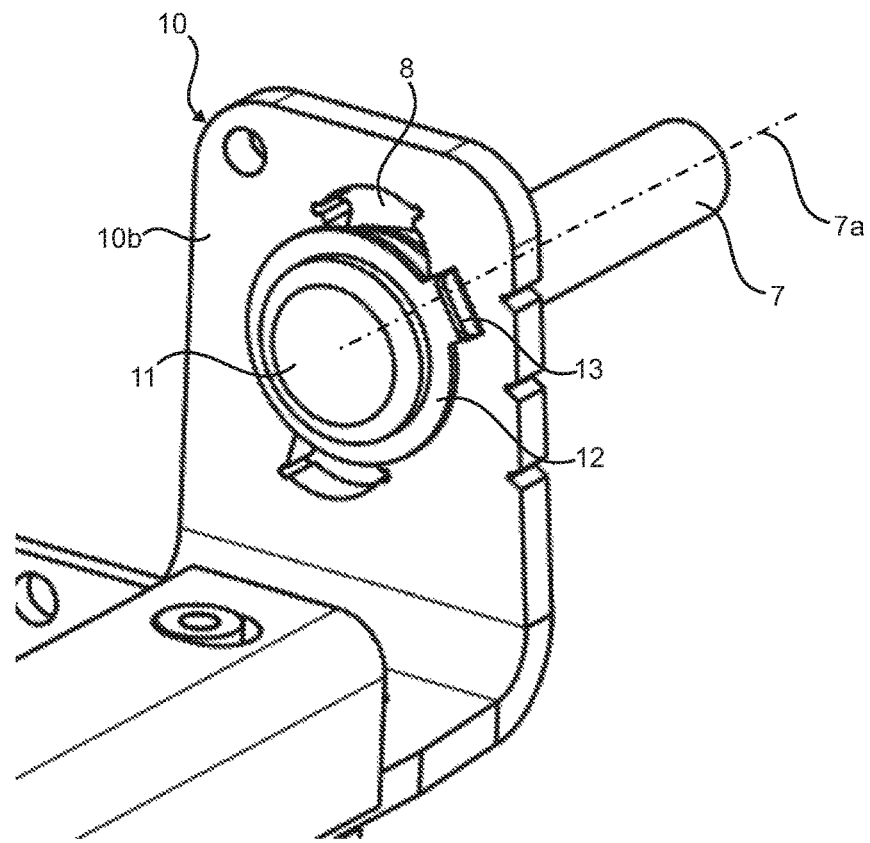
FIG. 5c is a schematic view of the relative position between the guide element and the handle element.

FIGS. 5a and 5b in particular show that a driving disc 12 is arranged between a second outer surface 10b of the guide link 10 and a flanged disc 11, the driving disc 12 having a handle element 13 on at least one circumferential point. A connection (for example a featherkey and keyway connection), by means of which the driving disc 12 is arranged in a non-rotational manner relative to the shaft 6, is formed but is not shown in the figures.

In the present case, the flanged disc 11 is arranged in the direction of the central axis 7a of the shaft 7 and is fixedly connected to the guide element 9.

In this case, the handle element 13 is in the form of a substantially rectangular metal tab canted simply by an angle of 90°. In the present case, said tab is also formed having rounded portions at the corners. In this case, the handle element 13 is arranged in direct contact with an outer circumference of the driving disc 12.

In the present case, an additional shaft element 17 is arranged so as to adjoin the guide element 9 in the axial direction 7a of the shaft 7 and is fixedly connected to the guide element 9. In this case, the driving disc 12 is arranged on the additional shaft element 17 by means of a connection consisting of a featherkey and corresponding keyway.

Figure 5C:
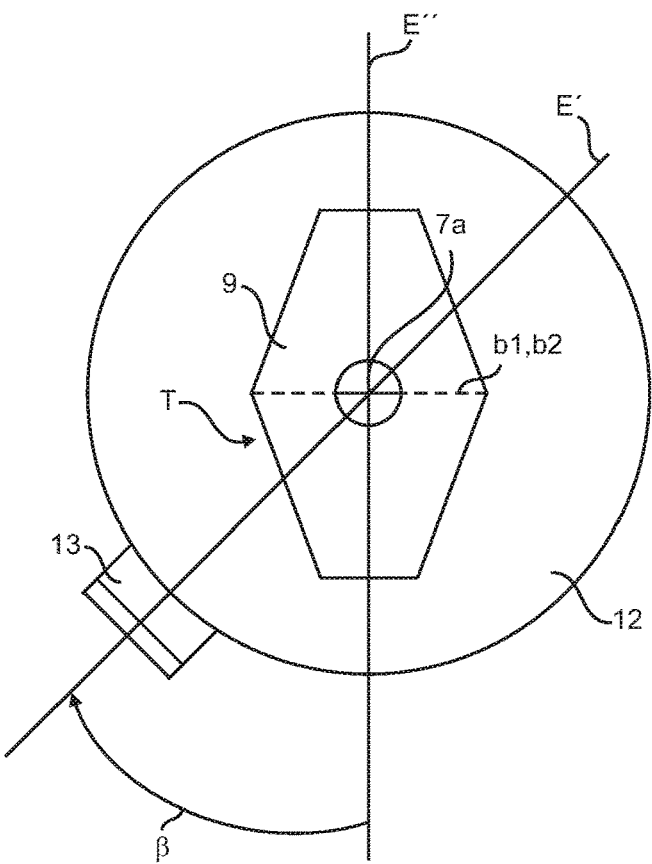

FIG. 5c shows that an angle β between a virtual first plane E', spanned by the central axis 7a of the shaft 7 and by a central axis or axis of symmetry of the handle element 13, and a virtual second plane E'', spanned by the central axis 7a of the shaft 7 and an axis perpendicular to the common first baseline b1, b2 of the two trapeziums T1, T2 of the double trapezium T, has a value of 45°. To ensure clarity, FIG. 5c does not show all the elements of the adjustment device 5 in question, but rather only the axis 7a of the shaft 7, the driving disc 12, the handle element 13 and the guide element 9 together with the baseline b1, b2, in their relative positions to one another.

FIGS. 2a to 2d show that, in this case, the user may not be able to see the guide element 9 directly when adjusting the adjustment device 5, i.e. when moving the guide element 9 within the guide link 8, since said element is arranged to be at least partly hidden.

The mark 18 on the second outer surface 10b, formed as a laser mark, comprises a first marking line 18a, denoting the middle locked position, and a second marking line 18b, denoting the middle adjustment position. For the sake of simplicity, said marking line 18 is shown in FIG. 3c as a combination of two solid lines on the surface 10a. In reality, the shape of the mark is designed as shown, but rather as a projection on the second outer surface 10b and advantageously in the form of dashed lines.

In the process, when the guide element 9 is located in the locked position according to the reference position A (first marking line 18a; see FIG. 3d) or in the adjustment position according to the reference position B (second marking line 18b; see FIG. 3c), said marking lines 18a, 18b each extend in parallel with the axis of the guide element 9 perpendicular to the common first baseline b1, b2 of the two trapeziums T1, T2 of the double trapezium T. In this case, the two lines 18a, 18b form an angle of 45° to one another.

It goes without saying that the embodiment explained above is just a first design of the commercial vehicle seat according to the invention. In this respect, the design of the invention is not limited to this embodiment.

All the features disclosed in the application documents are claimed as being essential to the invention wherever they are novel over the prior art when taken in isolation or in combination.

LIST OF REFERENCE SIGNS 1 vehicle seat
1x seat longitudinal direction
1y seat width direction
1z seat vertical direction
2 seat part
3 backrest part 4 operator device
5 adjustment device
6 axis of rotation
7 shaft
7a central axis
8 guide link
8a, 8b, 8c part
8i, 8j, 8k, 8l outer surfaces
9 guide element
9a, 9b, 9c, 9d outer surfaces
10 link element
10a, 10b outer surface
11 flanged disc
12 driving disc
13 handle element
14 reference surface
15 washer
16 edge
17 shaft element
18 mark
18a, 18b marking line
19 intermediate element
20 seat substructure
21 retaining part
B arc
b1, b2 first baseline
e1-e6 corner
hB, vB position
K1 virtual circle
K1M center point
M1 threaded nut
M2 external thread
SA1, SA2 axis of symmetry
T double trapezium
T1, T2 trapezium
u, v, w sides
UB circumferential direction
α, β angle

What is claimed is:

1. A vehicle seat comprising:
an operator device arranged at a side for operating at least one of a vehicle seat or vehicle functions; and
an adjustment device for adjusting at least one of a vertical position ($\Delta z$) or a tilt level of the operator device with respect to the rest of the vehicle seat,
wherein the adjustment device comprises:
an axis of rotation extending in a seat width direction;
a shaft which is connected to the operator device, is spaced apart from the axis of rotation and is arranged so as to be pivotable about the axis of rotation; and
a link element comprising a guide link and a guide element, wherein the guide element:
is arranued in the direction of a central axis of the shaft,
is fixedly connected to the shaft, and
is configured to move within the guide link between a first axial orientation and a second axial orientation, wherein the guide element engages with one of a plurality of locked surfaces when in the first axial orientation, wherein the guide element disengages with the one of the plurality of locked surfaces, enters an unlocked position and is free to move along an arc-shaped path within the guide link and about the axis of rotation when in the second axial orientation, wherein the guide link comprises at least one first part that extends along a portion of the arc-shaped path, and wherein the arc-shaped path extends concentrically about the axis of rotation and is constrained by the guide link.

2. The vehicle seat according to claim 1, wherein a distance ($\Delta L$) between the axis of rotation and the shaft is permanently fixed and the axis of rotation is arranged behind the shaft in a seat longitudinal direction.

3. The vehicle seat according to claim 1, wherein the guide link further comprises second parts which are arranged so as to adjoin the at least one first part and are substantially triangular.

4. The vehicle seat according to claim 1, wherein the guide link further comprises a first part and a second part, wherein the guide element is pivotable at least about the central axis of the shaft within the first and second parts of the guide link, and wherein the plurality of locked positions comprise at least two locked positions.

5. The vehicle seat according to claim 4, wherein the locked positions of the guide element are defined by outer surfaces of the guide element directly contacting outer surfaces of the guide link that are at an angle to the arc.

6. The vehicle seat according to claim 1, wherein a threaded nut interacts with an external thread of the shaft, and wherein the external thread is arranged adjacently to the guide element, and is fixed against a first outer surface of the guide link with a washer.

7. The vehicle seat according to claim 6, wherein a driving disc is arranged between a second outer surface of the guide link and a flanged disc in a non-rotational manner with respect to the shaft, the driving disc having a handle element on at least one circumferential point.

8. The vehicle seat according to claim 1, wherein a flanged disc is arranged in the direction of the central axis of the shaft and is fixedly connected to the guide element.

9. The vehicle seat according to claim 1, wherein the operator device is arranged at a side for operating vehicle seat functions.

10. The vehicle seat according to claim 1, wherein the operator device is arranged at a side for operating vehicle functions.

11. The vehicle seat according to claim 1, wherein the operator device is arranged at a side for operating vehicle seat functions and for operating vehicle functions.

12. The vehicle seat according to claim 1, wherein the adjustment device is for adjusting a vertical position of the operator device.

13. The vehicle seat according to claim 1, wherein the adjustment device is for adjusting a tilt level of the operator device.

14. The vehicle seat according to claim 1, wherein the adjustment device is for adjusting a vertical position and a tilt level of the operator device.

* * * * *